United States Patent [19]

Vermaire et al.

[11] Patent Number: 5,451,382
[45] Date of Patent: Sep. 19, 1995

[54] PROCESS AND PLANT FOR REMOVING LEAD, CADMIUM AND ZINC FROM DUSTS

[75] Inventors: Dirk C. Vermaire; Bernardus J. Damman, both of Middelburg, Netherlands

[73] Assignee: Hoechst Aktiengesellschaft, Frankfurt am Main, Germany

[21] Appl. No.: 112,856

[22] Filed: Aug. 26, 1993

[30] Foreign Application Priority Data

Sep. 10, 1992 [DE] Germany .................. 42 30 223.4

[51] Int. Cl.6 .................. C22B 13/00; C22B 17/00; C22B 19/00
[52] U.S. Cl. .................. 423/98; 423/109
[58] Field of Search .................. 423/98, 109, 92, 101, 423/319

[56] References Cited

U.S. PATENT DOCUMENTS

| | | | |
|---|---|---|---|
| 3,988,240 | 10/1976 | Loewy et al. | 423/319 |
| 4,537,756 | 8/1985 | Röttgen et al. | 423/323 |
| 4,889,702 | 12/1989 | Kolkmann et al. | 423/323 |
| 4,904,459 | 2/1990 | Kolkmann et al. | 423/92 |

*Primary Examiner*—Steven Bos
*Attorney, Agent, or Firm*—Connolly and Hutz

[57] ABSTRACT

To remove lead, cadmium and zinc from dusts produced in the electrostatic precipitator in the electrothermal production of yellow phosphorus, the dusts are first digested by phosphoric acid having a content of at least 25% by weight of $P_2O_5$ at temperatures above 60° C. in a ventilated reaction zone. The digest solution is then separated in a filter zone into an essentially lead-, cadmium- and zinc-free solid residue and a phosphoric acid containing dissolved lead, cadmium and zinc.

5 Claims, 1 Drawing Sheet

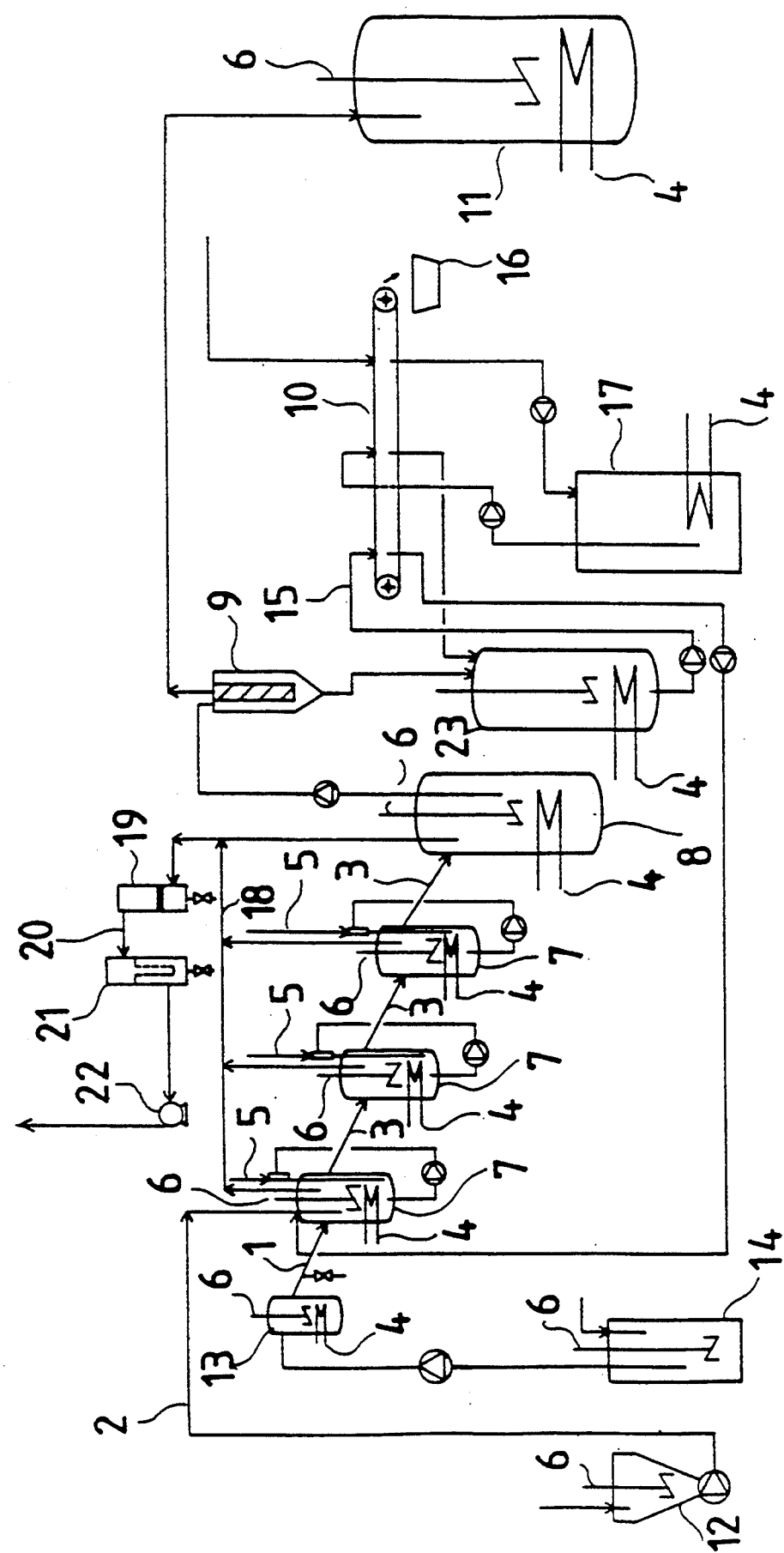

PROCESS AND PLANT FOR REMOVING LEAD, CADMIUM AND ZINC FROM DUSTS

FIELD OF THE INVENTION

The present invention relates to a process for removing lead, cadmium and zinc from dusts produced in the electrostatic precipitator in the electrothermal production of yellow phosphorus and a plant for carrying it out.

BACKGROUND AND PRIOR ART

From the electrothermal reduction furnace for producing yellow phosphorus is withdrawn a dust-containing gas mixture essentially composed of vaporous phosphorus and carbon monoxide which, prior to the condensation of the phosphorus contained therein, passes through an electrostatic precipitator in which the dusts are retained. These dusts which contain about 20% by weight of $P_2O_5$, as further major constituents $SiO_2$ and CaO and as minor components about 1.0 to 1.5% by weight of lead, about 0.3 to 0.5% by weight of cadmium and 5 to 6% by weight of zinc, are agitated with water to form a dust mash. From this dust mash, together with clay mash as binder, moldings can be prepared from crude phosphate on a granulation device which are then fired on a sintering device to form phosphate pellets.

In U.S. Pat. No. 4,537,756 it is proposed, for the removal of zinc, cadmium and other heavy metals, to process ground phosphorus furnace slags together with dust mash on a granulation device to form moldings, where the moldings, after drying and calcination, form pellets which contain the metals mentioned and which can be placed in a landfill.

A disadvantage, in particular, in the last-mentioned process is that zinc, cadmium and the other heavy metals contained in the pellets cannot by this means be taken to any further utilisation. Occasionally the dusts show radioactivity originating from the crude phosphate (lead 210 and derivatives).

SUMMARY OF THE INVENTION

It is therefore the object of the present invention to provide a process for removing lead, cadmium and zinc from dusts produced in the electrostatic precipitator in the electrothermal production of yellow phosphorus and a plant for carrying it out, in which the metals mentioned are extracted from the dusts in such a manner that they can be recovered from the extract and the remaining residue is virtually free from these metals.

This is achieved according to the invention by digesting the dusts using phosphoric acid having a content of at least 25% by weight of $P_2O_5$ at temperatures above 60° C. in a ventilated reaction zone and separating the digest solution in a filter zone into an essentially lead-, cadmium- and zinc-free solid residue and a phosphoric acid containing dissolved lead, cadmium and zinc.

DESCRIPTION OF THE PREFERRED EMBODIMENTS

The process according to the invention can, in addition, be optionally still further developed in that a) phosphoric acid produced by digestion of crude phosphate by mineral acids is used;

b) the phosphoric acid used has a molar Na/P ratio of less than 0.32;

c) phosphoric acid produced by combustion of yellow phosphorus is used;

d) the phosphoric acid used has a molar Na/P ratio of less than 0.21;

e) the phosphoric acid has a $P_2O_5$ content of 27 to 32% by weight, preferably 30 to 32% by weight;

f) the residence time in the reaction zone is 16 to 20 hours;

g) the residence time in the reaction zone is 22 to 26 hours;

h) an amount of air is introduced into the reaction zone such that a redox potential of at least +300 mV, preferably at least +400 mV is maintained therein.

Finally, a plant for carrying out the process according to the invention can comprise at least one reactor furnished with a feedline for phosphoric acid, with a feedline for dusts slurried in water, with an overflow line, with a heating device, with an air inlet pipe and with a stirrer; an intermediate vessel into which at least one of the overflow lines opens out; a thickening filter which is flow-connected to the intermediate vessel; a mashing vessel which is flow-connected to the thickening filter; a belt filter which can be charged with thick sludge from the mashing vessel; and a collecting vessel into which runs the clear flow from the thickening filter.

In the process according to the invention the molar Na/P ratio giving the degree of neutralisation of the phosphoric acid is determined by titrating the filtrate of the digest, after dilution with water, using adjusted sodium hydroxide solution up to the transition points of the molar Na/P ratios of 1 (pH=4.5) and 2 (pH=9.5). The calculation of the Na/P ratio is carried out according to the formula $$Na/P = 1 - \frac{\text{Alkali consumption up to pH 4.5}}{\text{Alkali consumption from pH 4.5 to pH 9.5}}$$

In the process according to the invention, the redox potential in the reaction zone is determined with the aid of a measurement bridge which is composed of a platinum electrode, a millivoltmeter and an Ag-/AgCl/KCl3M reference electrode.

In the process according to the invention, of the $P_2O_5$ contained in the dusts, up to 95% by weight is digested, of the lead and cadmium up to 98% by weight and of the zinc up to 95% by weight, the high digestion rates in the case of zinc, however, only being achieved if a high positive redox potential is maintained in the reaction zone by ventilation (or, possibly, by addition of $H_2O_2$). By blowing in air in the reaction, zone, at the same time, residues of elemental phosphorus are oxidized and hydrogen sulfide originating from digested sulfides is blown out.

BRIEF DESCRIPTION OF THE DRAWING FIGURE

In the accompanying drawing, a plant for carrying out the process according to the invention is diagrammatically depicted.

Dusts, slurried in water, from electrostatic precipitators of the electrothermal production of yellow phosphorus are placed in a first reactor 7 from a storage vessel 12 furnished with a stirrer 6 via a feedline 2, into which first reactor a feedline 1 for phosphoric acid also opens out, which is flow-connected to a preheater 13 and a reservoir 14. The reactors 7 are additionally furnished with an overflow line 3, a heating device 4, an air inlet tube 5 and a stirrer 6.

The overflow line 3 of the third reactor 7 opens out into an intermediate vessel 8 furnished with a heating device 4 and a stirrer 6, which intermediate vessel is itself flow-connected to a thickening filter 9. The paste-like cake exiting from the thickening filter 9 passes into a mashing tank 23, furnished with a stirrer 6 and heating device 4, in which it is processed with phosphoric acid and filter washing water to form a thick slurry. This thick slurry is delivered via a feed pipe 15 onto a belt filter 10, the solid being discarded into a residue vessel 16 while the filtrate is returned into the first reactor 7 and washing water from the belt filter 10 is fed to the mashing vessel 23. Fresh water delivered onto the belt filter 10 is collected in a washing vessel 17 furnished with a heating device 4 and again delivered for washing onto the belt filter 10. Finally, the clear flow from the thickening filter 9 is fed to a collecting vessel 11 furnished with a heating device 4 and stirrer 6.

By blowing air into the reactors 7, a considerable evaporation of water takes place, which causes the formation of phosphoric acid mists. Therefore, the reactors 7 and the intermediate vessel 8 are flow-connected to a vapor line 18, which opens out into a demister 19. From the head of the demister 19, a line 20 leads to a mist eliminator 21, which itself is flow-connected to the suction side of a fan 22.

EXAMPLE 1

Phosphoric acid (Na/P value: 0) prepared by combustion of yellow phosphorus and diluted to about 42% by weight of $H_3PO_4$ (30.4% by weight of $P_2O_5$) was pumped from the reservoir 14 (see the figure) into the preheater 13 and from there, 5.5 l/h were metered into the first reactor 7. At the same time, 1.4 l/h of dust mash (specific gravity: 1.29 g/l; solids content: 39% by weight) were metered from the storage vessel 12 into the first reactor 7. After an appropriate operating time, the two other reactors 7 were also filled and finally overflow proceeded at 6.0 l/h into the intermediate vessel 8. The residence time in the reactors 7 in this case was about 24 hours.

At the bottom of the reactors 7 were located air inlet tubes 5 with the aid of which, via polypropylene frits, very finely divided air was introduced into the reactors 7 at a rate of 6 to 10 l/min in each case.

Blowing in the air evaporated about 1 l/h of water; the water vapor was conducted via the vapor line 18 to the demister 19 and the mist eliminator 21 and withdrawn by the fan 22.

The contents of the preheater 13, the three reactors 7 and the intermediate vessel 8 were kept at an operating temperature of 80° C. by their heating devices 4.

The use of vacuum during filtration evaporates a small amount of water from the filtrate, as a result of which its temperature is reduced. If the filtrate temperature falls below 50° C., lead hydrogen phosphate ($PbHPO_4$) precipitates out, with the filtrate becoming cloudy, which precipitate redissolves extremely slowly by subsequent temperature increase. For this reason and because of the low solids content of the digest suspension, a thickening filter was used. 60 l/h of digest suspension (specific gravity: 1.30 g/l; Na/P value: 0.20; solids content: 35 g/kg) were delivered from the intermediate vessel 8 to the thickening filter 9 (cartridge pressure filter from Dr. Müller Apparatebau AG, Männedorf (Switzerland) having 0.16 m² filtering surface area; pressure rising up to 3 bar). The throughput was 375 l/m²h and the resulting pasty filter cake was 8 to 13 mm thick and contained approximately 35% of solids. In the mashing vessel 23, washing water from the belt filter 10, phosphoric acid and a small amount of hydrogen peroxide were added to the pasty filter cake with the formation of a thick slurry having a solids content of 15% by weight, the liquid phase of the thick slurry containing 17% by weight of $P_2O_5$ and having an Na/P value of 0.16. The thick slurry was filtered on the belt filter 10 (vacuum belt filter of the PANNEVIS company having 0.1 m² filtering surface area and two washing zones; belt velocity: 8 m/h; vacuum: 0.7 bar), the filtrate, which was free from lead hydrogen phosphate precipitates, being returned into the first reactor 7. The filter cake was about 8 mm thick, contained 0.2% by weight of soluble $P_2O_5$ and, after pressing, had a solids content of about 45% by weight.

Per kg of dust, which was used as dust mesh, 0.44 kg of digest residue (calculated as dry matter) resulted.

The removal of $P_2O_5$, Pb, Cd and Zn achieved from the dust is shown in the Table:

|       | Digest residue [% by weight] | Digest residue × 0.44 [% by weight] | Dust [% by weight] | Difference % |
| ----- | ---- | ---- | ---- | ---- |
| $SiO_2$ | 71.0 | 31.2 | 31.0 | +0.6 |
| $P_2O_5$ | 2.5 | 1.1 | 20.0 | −95 |
| CaO   | 6.2  | 2.7  | 13.0 | −79 |
| Pb    | 0.0254 | 0.011 | 1.04 | −99 |
| Cd    | 0.0023 | 0.001 | 0.36 | −99 |
| Zn    | 0.12 | 0.053 | 3.29 | −98 |

EXAMPLE 2

Phosphoric acid having an Na/P value of 0.17 obtained by digestion of crude phosphate by mineral acid and diluted to about 42% by weight of $H_3PO_4$ (30.4% by weight of $P_2O_5$) was pumped from the reservoir 14 (see the FIGURE) into the preheater 13 and from there 8.0 l/h were metered into the first reactor 7. At the same time, 1.3 l/h of dust mash (specific gravity: 1.29 g/l; solids content: 39% by weight) were metered from the storage vessel 12 into the first reactor 7. After an appropriate operating time, the two other reactors 7 were also filled and finally overflow took place at 7.5 l/h into the intermediate vessel 8. The residence time in the reactors 7 was about 20 hours in this case.

At the bottom of the reactors 7 were located air inlet tubes 5 with the aid of which, via polypropylene frits, very finely divided air was introduced into the reactors 7 at a rate of 6 to 10 l/min in each case.

Blowing in the air evaporated about 1 l/h of water; the water vapor was conducted via the vapor line 18 to the demister 19 and the mist eliminator 21 and withdrawn by the fan 22.

The contents of the preheater 13, the three reactors 7 and the intermediate vessel 8 were kept at an operating temperature of 80° C. by their heating devices 4.

The use of vacuum during filtration evaporates a small amount of water from the filtrate, as a result of which its temperature is reduced. If the filtrate temperature falls below 50° C., lead hydrogen phosphate ($PbHPO_4$) precipitates out, with the filtrate becoming cloudy, which precipitate redissolves extremely slowly by subsequent temperature increase. For this reason and because of the low solids content of the digest suspension, a thickening filter was used. 60 l/h of digest suspension (specific gravity: 1.32 g/l; Na/P value: 0.30; solids content: 25 g/kg) were delivered from the intermediate vessel 8 to the thickening filter 9 (cartridge pressure filter from Dr. Müller Apparatebau AG, Männedorf (Switzerland) having 0.16 m² filtering surface area; pressure rising up to 3 bar). The throughput was 375 l/m²h and the resulting pasty filter cake was 8 to 13 mm thick and contained approximately 33% of solids. In the mashing vessel 23, washing water from the belt filter 10, phosphoric acid and a small amount of hydrogen peroxide were added to the pasty filter cake with the formation of a thick slurry having a solids content of 15% by weight, the liquid phase of the thick slurry containing 17% by weight of $P_2O_5$ and having an Na/P value of 0.26. The thick slurry was filtered on the belt filter 10 (vacuum belt filter of the PANNEVIS company having 0.1 m² filtering surface area and two washing zones; belt velocity: 8 m/h; vacuum: 0.7 bar), the filtrate, which was free from lead hydrogen phosphate precipitates, being returned into the first reactor 7. The filter cake was about 8 mm thick, contained 0.2% by weight of soluble $P_2O_5$ and, after pressing, had a solids content of about 45% by weight.

Per kg of dust, which was used as dust mesh, 0.44 kg of digest residue (calculated as dry matter) resulted.

The removal of $P_2O_5$, Pb, Cd and Zn achieved from the dust is shown in the Table:

|  | Digest residue [% by weight] | Digest residue × 0.44 [% by weight] | Dust [% by weight] | Difference % |
| --- | --- | --- | --- | --- |
| $SiO_2$ | 68.0 | 29.9 | 28.6 | +4.6 |
| $P_2O_5$ | 2.7 | 1.2 | 27.3 | −96 |
| CaO | 6.0 | 2.6 | 11.3 | −78 |
| Pb | 0.083 | 0.037 | 1.1 | −97 |
| Cd | 0.007 | 0.003 | 0.39 | −99 |
| Zn | 0.42 | 0.18 | 3.85 | −95 |

We claim:

1. A process for removing lead, cadmium and zinc from dusts separated in an electrostatic precipitator during electrothermal production of yellow phosphorus, which comprises digesting the dusts with phosphoric acid having a molar Na/P ratio of less than 0.32 and a content of 27 to 32% by weight of $P_2O_5$ for 16 to 20 hours, at temperatures above 60° C., in a ventilated reaction zone and introducing an amount of air into said reaction zone such that a redox potential of at least +300 mV is maintained therein with resultant formation of a phosphoric acid suspension, and separating the phosphoric acid suspension in a filter zone into an essentially lead-, cadmium- and zinc-free solid residue and a phosphoric acid solution containing dissolved lead, cadmium and zinc.

2. The process as claimed in claim 1, wherein the redox potential is at least +400 mV.

3. A process for removing lead, cadmium and zinc from dusts separated in an electrostatic precipitator during electrothermal production of yellow phosphorus, which comprises digesting the dusts with phosphoric acid having been produced by combustion of yellow phosphorus and having a molar Na/P ratio of less than 0.21 and a content of 27 to 32% by weight of $P_2O_5$ for 22 to 26 hours, at temperatures above 60° C., in a ventilated reaction zone and introducing an amount of air into said reaction zone such that a redox potential of at least +300 mV is maintained therein with the resultant formation of phosphoric acid suspension, and separating phosphoric acid suspension in a filter zone into an essentially lead-, cadmium- and zinc-free solid residue and a phosphoric acid solution containing dissolved lead, cadmium and zinc.

4. The process as claimed in claim 3, wherein the $P_2O_5$ content is 30 to 32% by weight.

5. The process as claimed in claim 3, wherein the redox potential is at least +400 mV.

* * * * *